United States Patent
Fujii et al.

(10) Patent No.: US 12,533,809 B2
(45) Date of Patent: Jan. 27, 2026

(54) ROBOT POSTURE DETERMINATION DEVICE, METHOD, AND PROGRAM

(71) Applicant: OMRON Corporation, Kyoto (JP)

(72) Inventors: Haruka Fujii, Kyoto (JP); Takeshi Kojima, Kyoto (JP); Ryoichi Kuratani, Kyoto (JP)

(73) Assignee: OMRON Corporation, Kyoto (JP)

( * ) Notice: Subject to any disclaimer, the term of this patent is extended or adjusted under 35 U.S.C. 154(b) by 213 days.

(21) Appl. No.: 18/278,239

(22) PCT Filed: Jan. 19, 2022

(86) PCT No.: PCT/JP2022/001841
§ 371 (c)(1),
(2) Date: Aug. 22, 2023

(87) PCT Pub. No.: WO2022/185760
PCT Pub. Date: Sep. 9, 2022

(65) Prior Publication Data
US 2024/0123621 A1 Apr. 18, 2024

(30) Foreign Application Priority Data
Mar. 3, 2021 (JP) ................................. 2021-033845

(51) Int. Cl.
*B25J 9/16* (2006.01)
(52) U.S. Cl.
CPC ........... *B25J 9/1669* (2013.01); *B25J 9/1664* (2013.01); *G05B 2219/40463* (2013.01)
(58) Field of Classification Search
CPC .................. B25J 9/1669; B25J 9/1664; G05B 2219/40463
See application file for complete search history.

(56) References Cited

U.S. PATENT DOCUMENTS 9,555,545 B2 * 1/2017 Linnell ................ B25J 9/1656
10,127,677 B1 * 11/2018 Anderson-Sprecher ..................... G06T 7/251

(Continued)

FOREIGN PATENT DOCUMENTS

CN 110576436 A 12/2019
CN 110914024 A 3/2020

(Continued)

OTHER PUBLICATIONS

Extended European Search Report issued in corresponding European Patent Application No. 22762819.5, dated Jan. 15, 2025.

(Continued)

*Primary Examiner* — Sohana Tanju Khayer
(74) *Attorney, Agent, or Firm* — Morgan, Lewis & Bockius LLP

(57) ABSTRACT

An acquisition unit acquires work information related to work to be performed by a robot having a hand part, grasping information indicating a plurality of candidates for the relative positional relationship between the hand part and a workpiece, workpiece posture information indicating a plurality of candidates for a posture adoptable by the workpiece, and kinematics information regarding the robot. A generation unit generates, for a plurality of target points on a path of the robot for performing the work, a graph which includes a node corresponding to each combination of the workpiece posture information, the posture of the hand part grasping the workpiece, and the posture of the robot, and an edge connecting nodes corresponding to combinations that are transitionable between target points, and in which an estimated operation time corresponding to the transition between the nodes connected by the edge is given to the edge as a weight.

13 Claims, 11 Drawing Sheets

(56) References Cited

U.S. PATENT DOCUMENTS

| | | | |
|---|---|---|---|
| 11,806,876 B2* | 11/2023 | Imanishi | B25J 9/163 |
| 2006/0255758 A1 | 11/2006 | Takahashi et al. | |
| 2012/0239194 A1* | 9/2012 | Kagawa | B25J 9/1692 700/254 |
| 2013/0079929 A1* | 3/2013 | Lim | B62D 57/032 700/250 |
| 2017/0097631 A1 | 4/2017 | Linnell et al. | |
| 2019/0061159 A1 | 2/2019 | Domae et al. | |
| 2019/0184560 A1* | 6/2019 | Liu | B25J 9/1605 |
| 2019/0275675 A1* | 9/2019 | Seno | G05B 19/02 |
| 2019/0375104 A1 | 12/2019 | Moriya et al. | |
| 2020/0139545 A1 | 5/2020 | Hayashi et al. | |
| 2020/0148489 A1* | 5/2020 | Diankov | G06T 7/55 |
| 2020/0406460 A1* | 12/2020 | Enomoto | G06Q 10/0631 |
| 2021/0001483 A1* | 1/2021 | Milenkovic | B25J 9/1666 |
| 2021/0060774 A1* | 3/2021 | Butterfoss | B25J 9/1666 |
| 2021/0069905 A1* | 3/2021 | Zhang | B25J 9/1664 |
| 2021/0103290 A1* | 4/2021 | Pajovic | G05D 1/0287 |
| 2021/0129331 A1* | 5/2021 | Tokuoka | B25J 9/1664 |
| 2021/0154832 A1* | 5/2021 | Truebenbach | B25J 17/0241 |
| 2021/0308865 A1* | 10/2021 | Lin | B25J 9/1651 |
| 2021/0308866 A1* | 10/2021 | Zhu | B25J 9/1666 |
| 2022/0143829 A1* | 5/2022 | Takahashi | B25J 9/1664 |
| 2022/0184808 A1* | 6/2022 | Zheng | B25J 9/1666 |
| 2022/0371195 A1* | 11/2022 | Lee | B25J 9/1697 |
| 2022/0379473 A1* | 12/2022 | Yamauchi | G05B 19/4093 |
| 2024/0083035 A1* | 3/2024 | Shitaka | B25J 9/1612 |

FOREIGN PATENT DOCUMENTS

| | | | |
|---|---|---|---|
| JP | 2003-094363 A | | 4/2003 |
| JP | 2004-358593 A | | 12/2004 |
| JP | 2007-203380 A | | 8/2007 |
| JP | 2019-028775 A | | 2/2019 |
| WO | 2017/183414 A1 | | 10/2017 |
| WO | 2018/092860 A1 | | 5/2018 |
| WO | 2020/083633 A1 | | 4/2020 |

OTHER PUBLICATIONS

International Search Report issued in corresponding International Application No. PCT/JP2022/001841 dated Mar. 15, 2022.
Written Opinion of the International Searching Authority issued in corresponding International Application No. PCT/JP2022/001841 dated Mar. 15, 2022.
Office Action issued in corresponding Chinese Patent Application No. 202280017811.5, dated Oct. 31, 2025.

* cited by examiner

ROBOT POSTURE DETERMINATION DEVICE, METHOD, AND PROGRAM

TECHNICAL FIELD

The present disclosure relates to a robot posture determination device, a robot posture determination method, and a robot posture determination program.

BACKGROUND ART

Conventionally, teaching of a work posture of a robot for causing the robot to perform a predetermined work has been performed by a skilled worker depending on intuition, skill, experience, and the like such that an operation time of the robot is the shortest. However, due to an increase and complication of work performed by the robot, it is difficult to determine a posture of the robot in which the operation time of the robot is the shortest, and there is a problem that a time required for trial and error to determine a posture of a robot becomes long. Therefore, a technique for supporting determination of a posture of a robot has been proposed.

For example, a teaching support device capable of calculating a combination of angle positions of each joint for each optimum movement point in a short time has been proposed (see Patent Literature 1: Japanese Patent Application Laid-Open No. 2007-203380). The device described in Patent Literature 1 obtains all movement times between movement points for each combination of solution candidates, and extracts a combination of upstream solution candidates having the shortest movement time with respect to downstream solution candidates. Based on the extraction result, the device searches for a combination of solution candidates in which an overall movement time for moving an arm tip from a start point to an end point is the shortest.

SUMMARY OF INVENTION

Technical Problem

For example, it is assumed that a robot is caused to execute work of grasping and moving a workpiece with a robot hand. In this case, there are many variations in a grasping state of the workpiece by the robot hand.

However, in the technique described in Patent Literature 1, it is assumed that an initial solution of a position and a posture of each movement point of a movement target region (arm tip) of the robot is input. That is, in the technique described in Patent Literature 1, the grasping state as described above needs to be specified in advance, and it is not considered that there are many variations in the grasping state.

The disclosure has been made in view of the above points, and an object of the disclosure is to efficiently determine an optimum posture of a robot including a grasping state with respect to a workpiece.

Solution to Problem

In order to achieve the above object, a robot posture determination device according to the disclosure includes: an acquisition unit configured to acquire work information related to work to be performed by a robot having a hand part, grasping information indicating a plurality of candidates for a relative positional relationship between the hand part and a workpiece to be grasped by the hand part, workpiece posture information indicating a plurality of candidates for a posture adoptable by the workpiece, and specification information including kinematics information regarding the robot; and a searching unit configured to associate, for each of a plurality of target points on a path of the robot for performing the work, respective combinations of the workpiece posture information, a posture of the hand part for grasping the workpiece obtained based on the work information, the grasping information, and the workpiece posture information, and a posture of the robot according to the posture of the hand part obtained based on the posture of the hand part and the kinematics information, and to search for a sequence of the combinations that will result in a shortest operation time of the robot based on an index related to an operation time of the robot between the postures of the robot from sequences of the combinations that are transitionable between the target points.

The searching unit may determine that the combinations are non-transitionable between the target points when grasping postures specified based on the workpiece posture information and the posture of the hand part of the combinations are different.

The searching unit may determine that the combinations are non-transitionable between the target points when operation of the robot between the postures of the robot in the combinations is linear movement and forms of the postures of the robot in the combinations are different.

The searching unit may calculate an index based on a difference between the postures of the robot in the combinations as the index related to the operation time.

The searching unit may calculate, as the index based on the difference in the postures of the robot, a maximum value of a value obtained by dividing a difference in a rotation angle of each joint of the robot by a maximum value of a rotation speed of each joint.

The searching unit may generate a graph including a node corresponding to each of the combinations and an edge connecting nodes corresponding to the combinations transitionable between the target points, the graph applying the index related to the operation time to the edge, and search for a sequence of the combinations that will result in the shortest operation time of the robot by using the graph.

The acquisition unit may acquire peripheral information indicating a peripheral environment in which the robot performs work and specification information further including dynamics information and shape information of the robot, and the searching unit may determine, based on the peripheral information, the specification information, and the posture of the robot, that nodes at which unavoidable interference with the peripheral environment is estimated to occur in a path between the postures of the robot corresponding to the nodes are nodes corresponding to the combinations that are non-transitionable between the target points The searching unit may not generate a node corresponding to the combination including a posture of the robot that interferes with the peripheral environment at the target point.

The searching unit may calculate an actual operation time of the robot between postures of the robot corresponding to nodes connected by an edge included in a path of the graph corresponding to the searched sequence, update a weight of the edge between the nodes with the calculated actual operation time, and repeat the search for the sequence which results in the shortest operation time until a same sequence as the sequence searched last time is found.

The searching unit may calculate, as the actual operation time, an operation time in a case where the robot operates an operation in which the robot avoids interference with the peripheral environment between the postures of the robot corresponding to the nodes at a set speed or with acceleration/deceleration.

The target point may include a work point at which the hand part grasps or releases the workpiece and an operation change point at which an operation direction of the robot is changed.

A robot posture determination method according to the disclosure is a method including, acquiring, by an acquisition unit, work information related to work to be performed by a robot having a hand part, grasping information indicating a plurality of candidates for a relative positional relationship between the hand part and a workpiece to be grasped by the hand part, workpiece posture information indicating a plurality of candidates for a posture adoptable by the workpiece, and specification information including kinematics information regarding the robot; and associating, by a searching unit, for each of a plurality of target points on a path of the robot for performing the work, respective combinations of the workpiece posture information, a posture of the hand part for grasping the workpiece obtained based on the work information, the grasping information, and the workpiece posture information, and a posture of the robot according to the posture of the hand part obtained based on the posture of the hand part and the kinematics information, and searching for a sequence of the combinations that will result in a shortest operation time of the robot based on an index related to an operation time of the robot between the postures of the robot from sequences of the combinations that are transitionable between the target points.

A robot posture determination program according to the disclosure is a program executable by a computer to function as: an acquisition unit configured to acquire work information related to work to be performed by a robot having a hand part, grasping information indicating a plurality of candidates for a relative positional relationship between the hand part and a workpiece to be grasped by the hand part, workpiece posture information indicating a plurality of candidates for a posture adoptable by the workpiece, and specification information including kinematics information regarding the robot; and a searching unit configured to associate, for each of a plurality of target points on a path of the robot for performing the work, respective combinations of the workpiece posture information, a posture of the hand part for grasping the workpiece obtained based on the work information, the grasping information, and the workpiece posture information, and a posture of the robot according to the posture of the hand part obtained based on the posture of the hand part and the kinematics information, and search for a sequence of the combinations that will result in a shortest operation time of the robot based on an index related to an operation time of the robot between the postures of the robot from sequences of the combinations that are transitionable between the target points.

Advantageous Effects of Invention

According to the robot posture determination device, the method, and the program according to the disclosure, it is possible to efficiently determine an optimum posture of a robot including a grasping state with respect to a workpiece.

DESCRIPTION OF EMBODIMENTS

Figure 1:
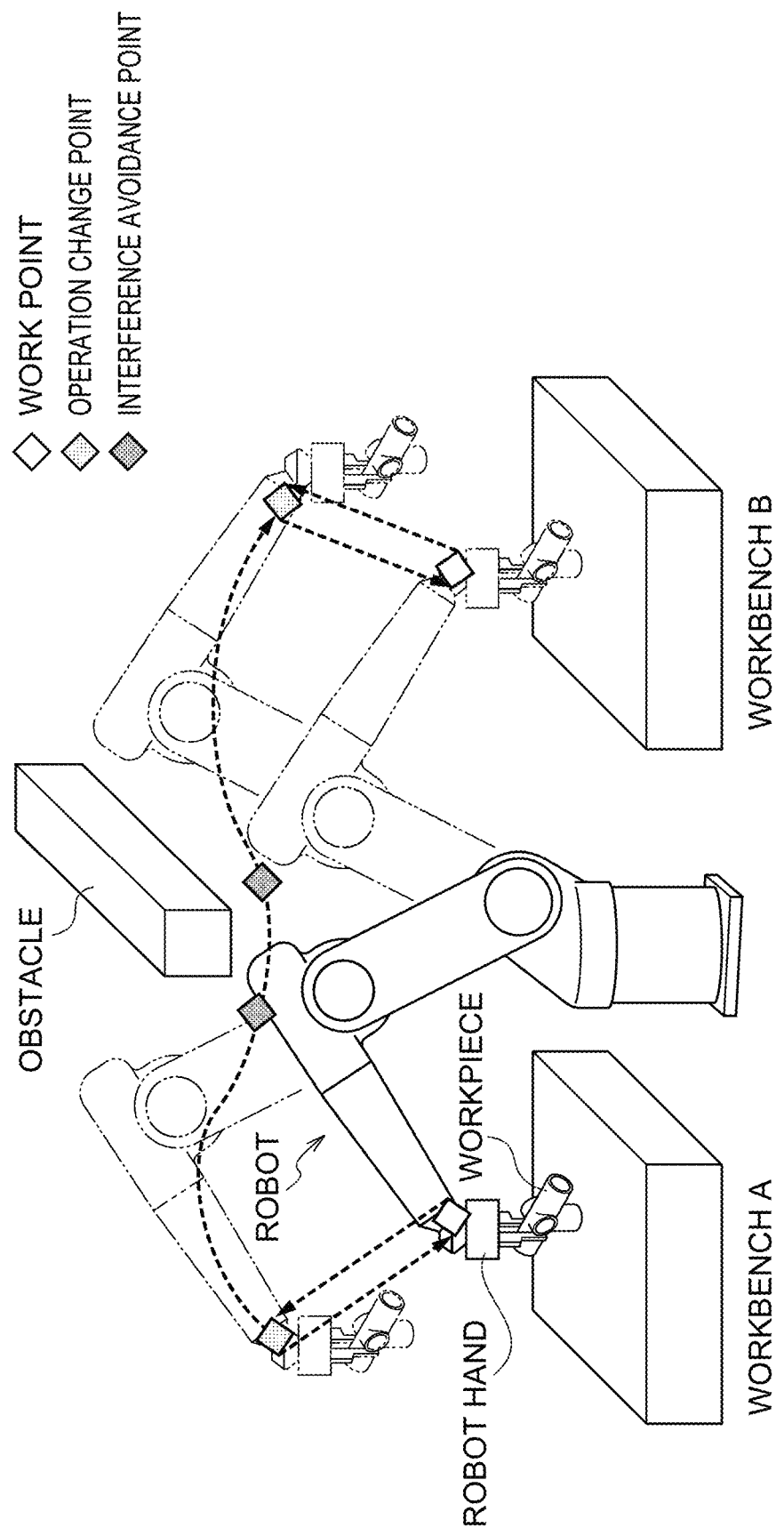
FIG. 1 is a diagram for describing an outline of each embodiment.

Hereinafter, examples of embodiments of the disclosure will be described with reference to the drawings. In the drawings, the same or equivalent components and portions are denoted by the same reference numerals. Dimensions and ratios of the drawings are exaggerated for convenience of description, and may be different from actual ratios.

Outline of Each Embodiment

First, an outline of each embodiment described in detail below will be described.

As illustrated in FIG. 1, the robot posture determination device according to each embodiment determines a posture of a robot at each target point of an operation of the robot when causing the robot having a robot hand to perform work of handling a workpiece. The robot hand is an example of a hand part of the disclosed technique. In the example of FIG. 1, an example of pick-and-place work of grasping (picking) a workpiece placed on a workbench A with a robot hand and placing (placing) the workpiece on a workbench B is illustrated. More specifically, it is work of grasping the workpiece on the workbench A, raising the robot hand by linear movement, then moving the robot hand toward the workbench B, lowering the robot hand by linear movement, and placing the workpiece on the workbench B.

The target points include a work point (white rhombus in FIG. 1) at which the robot hand performs work of grasping or releasing the workpiece, and an operation change point (shaded rhombus in FIG. 1) at which an operation direction of the robot is changed. The target point is specified by coordinates (x, y, z) in a world coordinate system. An interference avoidance point (black rhombus in FIG. 1) is also set on a path indicating the operation of the robot in order to avoid interference with an obstacle. However, in each of the following embodiments, the posture of the robot at the interference avoidance point is determined by path planning for automatically determining a path between target points, and the interference avoidance point is not included in the target point.

The robot posture determination device according to each of the following embodiments determines a posture of the robot at each target point such that the operation time is the shortest when the robot is operated according to the path through the target point as described above.

In each of the following embodiments, a case where the robot is a vertical articulated robot having a configuration of six degrees of freedom necessary for an operation in a three-dimensional space will be described. More specifically, the robot is configured by connecting a plurality of links, and a robot hand is attached to an arm tip of the robot. The coupling between the links is referred to as a joint (joint). A reference position of the arm tip (a side on which a robot hand is attached) of the robot is referred to as a tool center point (TCP).

The posture of the robot is represented by a sequence ($\theta_{J1}$, $\theta_{J2}, \ldots, \theta_{JN}$) of values (rotation angles) of joints from a first joint (joint J1) to an N-th joint (joint JN, N is the number of joints of the robot) of the robot in a case where it is assumed that the TCP is at a predetermined position (x, y, z) and posture (roll, pitch, yaw). In each of the following embodiments, J1, J2, . . . are assumed in order from a base side toward the arm tip of the robot. A path is obtained by arranging the postures of the robot at each time when the TCP is operated from an arbitrary start point to an end point in time series, and information on a speed and acceleration/deceleration for changing the posture is added to the path, which is operation information. Hereinafter, each embodiment will be described in detail.

First Embodiment

Figure 2:
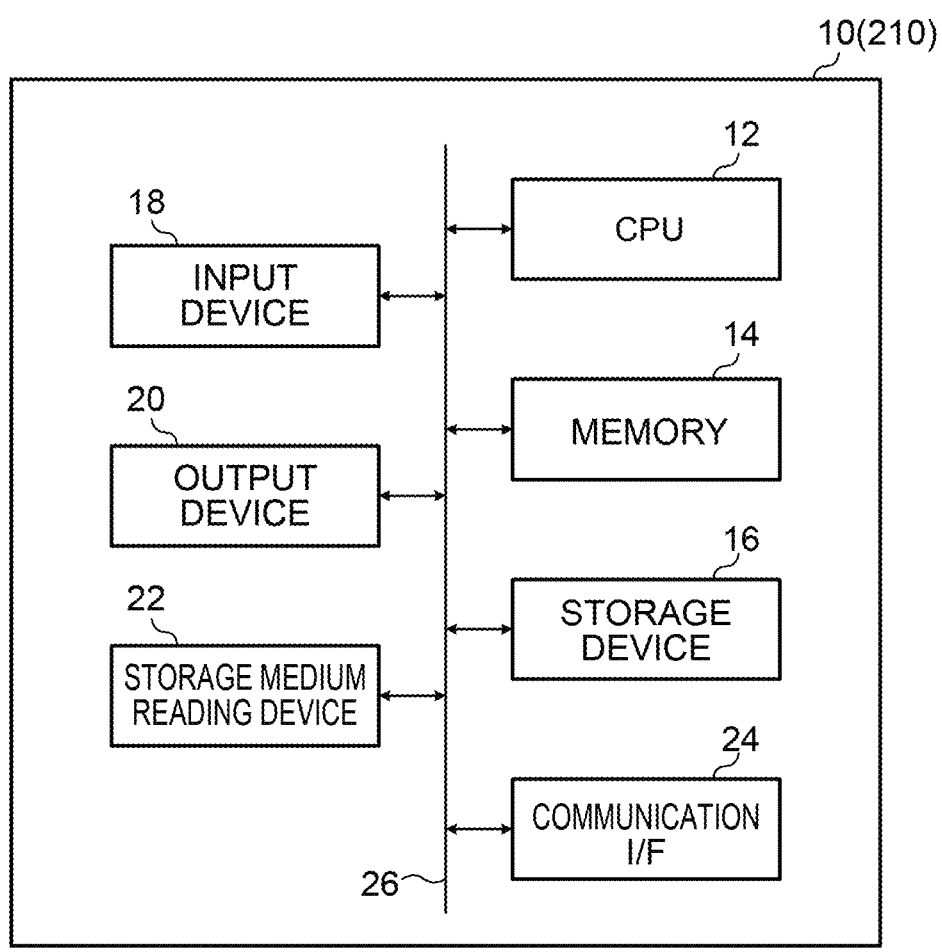
FIG. 2 is a block diagram illustrating a hardware configuration of a robot posture determination device.

FIG. 2 is a block diagram illustrating a hardware configuration of a robot posture determination device 10 according to a first embodiment. As illustrated in FIG. 2, the robot posture determination device 10 includes a central processing unit (CPU) 12, a memory 14, a storage device 16, an input device 18, an output device 20, a storage medium reading device 22, and a communication interface (I/F) 24. The respective configurations are communicably coupled to each other via a bus 26.

The storage device 16 stores a robot posture determination program for executing robot posture determination processing to be described later. The CPU 12 is a central arithmetic processing unit, and executes various programs and controls each configuration. That is, the CPU 12 reads a program from the storage device 16 and executes the program by using the memory 14 as a work region. The CPU 12 performs control of each of the above-described configurations and various types of arithmetic processing according to the program stored in the storage device 16.

The memory 14 includes a random access memory (RAM), and temporarily stores a program and data as a work region. The storage device 16 includes a read only memory (ROM), a hard disk drive (HDD), a solid state drive (SSD), and the like, and stores various programs including an operating system and various data.

The input device 18 is a device for performing various inputs, such as a keyboard or a mouse. The output device 20 is, for example, a device for outputting various types of information, such as a display or a printer. A touch panel display may be employed as the output device 20 to function as the input device 18.

The storage medium reading device 22 reads data stored in various storage media such as a compact disc (CD)-ROM, a digital versatile disc (DVD)-ROM, a Blu-ray disc, or a universal serial bus (USB) memory, writes data to the storage medium, and the like. The communication I/F 24 is an interface for communicating with other devices, and for example, standards such as Ethernet (registered trademark), FDDI, or Wi-Fi (registered trademark) are used.

Figure 3:
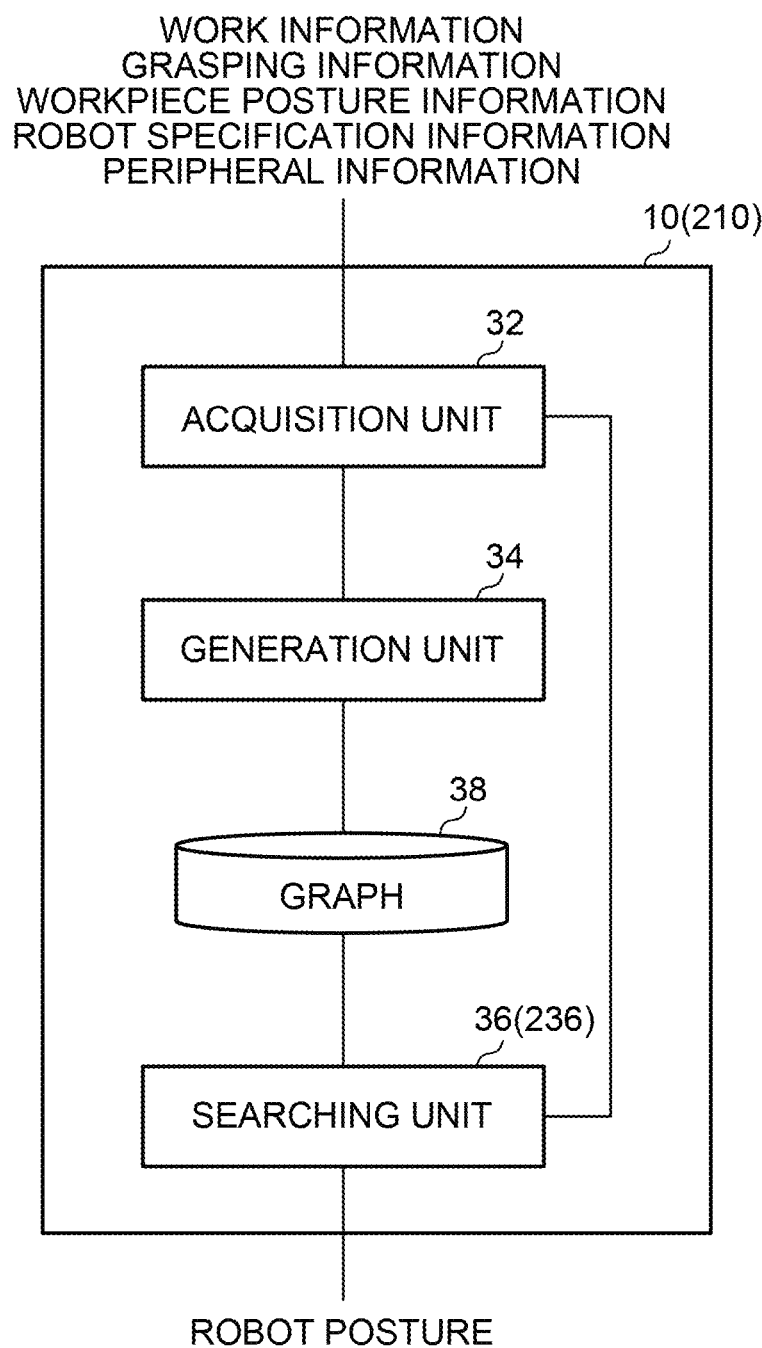
FIG. 3 is a block diagram illustrating an example of a functional configuration of a robot posture determination device.

Next, a functional configuration of the robot posture determination device 10 according to the first embodiment will be described. FIG. 3 is a block diagram illustrating an example of a functional configuration of the robot posture determination device 10. As illustrated in FIG. 3, the robot posture determination device 10 includes an acquisition unit 32, a generation unit 34, and a searching unit 36 as functional configurations. The generation unit 34 and the searching unit 36 are examples of a "searching unit" of the disclosure. Each functional configuration is implemented by the CPU 12 reading the robot posture determination program stored in the storage device 16, developing the program in the memory 14, and executing the program. A graph 38 generated by the generation unit 34 is stored in a predetermined storage region of the robot posture determination device 10.

The acquisition unit 32 acquires work information, grasping information, workpiece posture information, robot specification information, and peripheral information.

The work information includes information such as a type of work, an order of work, a workpiece used in the work, and a grasping state indicating which portion of the workpiece is grasped by which portion of the robot hand.

Figure 4:
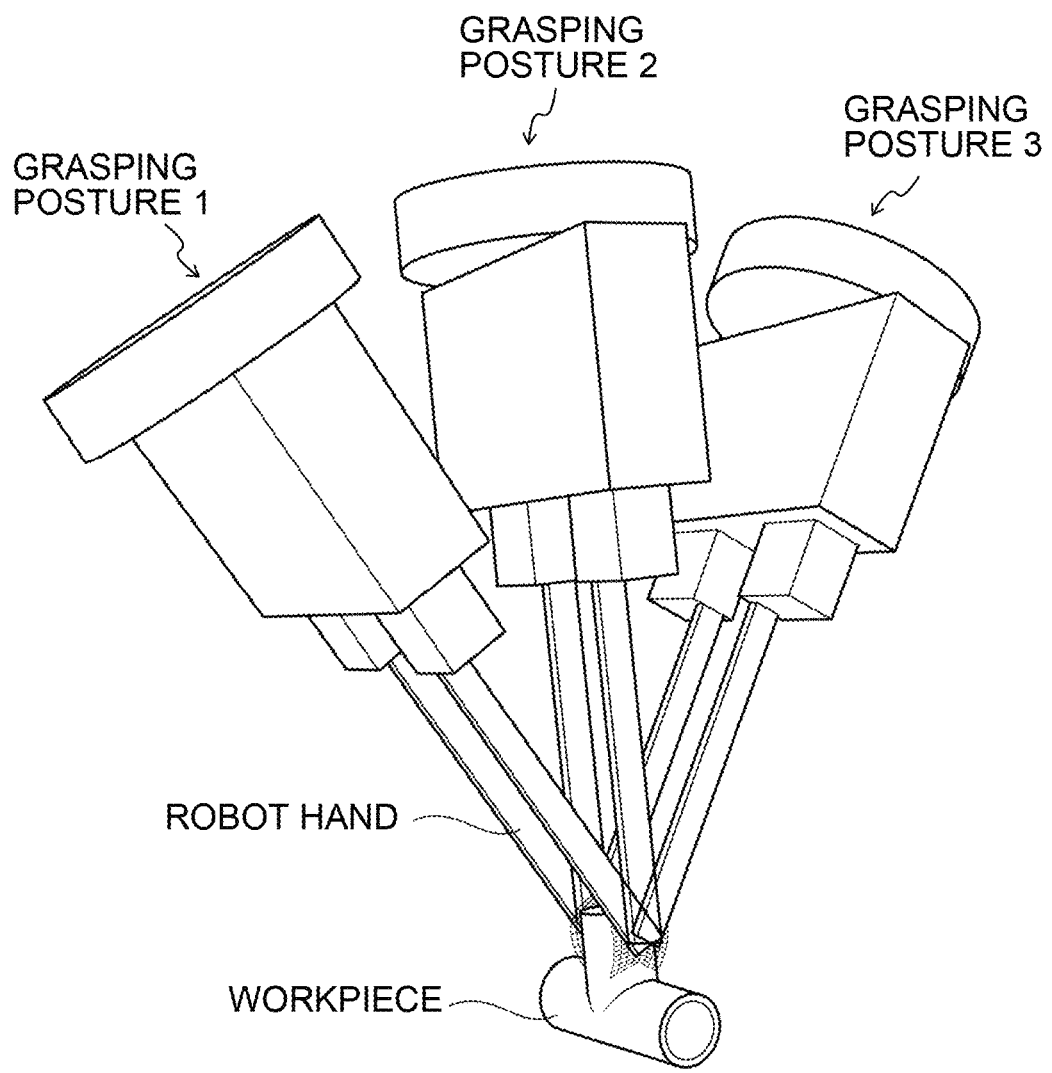
FIG. 4 is a diagram for describing grasping information.

The grasping information is information indicating a plurality of candidates for a relative positional relationship between the robot hand and the workpiece grasped by the robot hand. Specifically, for example, as illustrated in FIG. 4, the grasping information is information of relative coordinates (x, y, z) and a relative posture (roll, pitch, yaw) (hereinafter, referred to as a "grasping posture") of the TCP with respect to the workpiece when the workpiece is grasped by the robot hand. The grasping information acquired by the acquisition unit 32 is a list of grasping information for a plurality of grasping postures. In the example of FIG. 4, three grasping postures (grasping posture 1, 2, and 3) are illustrated, but the list includes grasping information of more grasping postures (for example, several tens of patterns).

Figure 5:
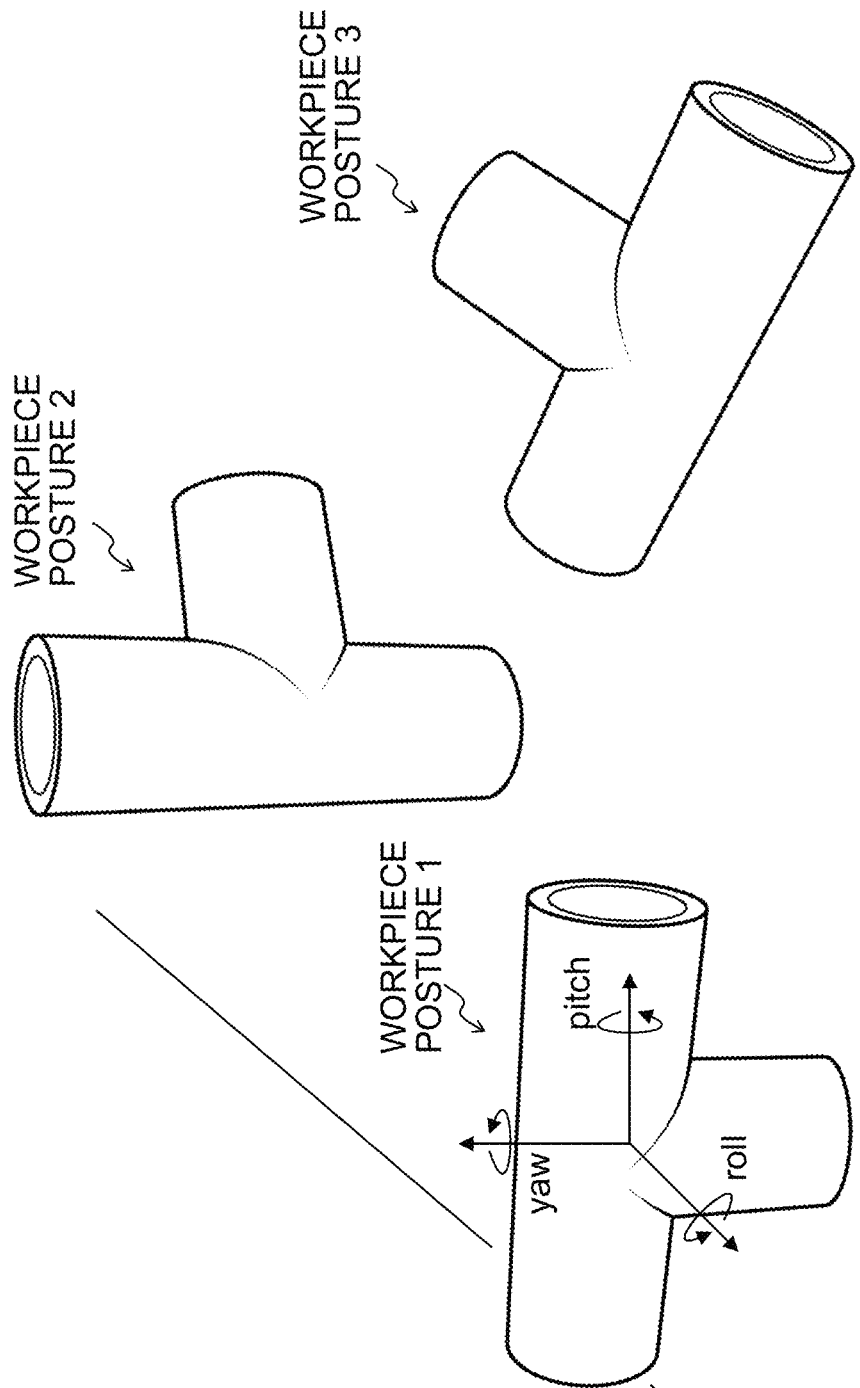
FIG. 5 is a diagram for describing workpiece posture information.

The workpiece posture information is a stable posture adoptable by the workpiece when the workpiece is placed on a workbench or the like in a random manner. FIG. 5 illustrates examples (workpiece postures 1, 2, and 3) of workpiece postures of a T-shaped and pipe-shaped workpiece. The workpiece posture information is represented by, for example, a degree of freedom of a posture (roll, pitch, yaw). For example, in a case of the workpiece posture 1 illustrated in FIG. 5, roll and pitch are represented by the workpiece posture information of fixed at 0° and yaw is represented by the workpiece posture information of free rotation. The workpiece posture information may be determined for each posture in which a rotation angle of a freely rotatable axis is changed by a predetermined angle.

The robot specification information includes kinematics information indicating a coupling relationship between links and a structure such as a rotation axis of a link, dynamics information which is information for specifying a speed at the time of operation of a link such as a weight of each link, and shape information about each link. The shape information may be three-dimensional data such as computer-aided design (CAD) data.

The peripheral information is information indicating a peripheral environment in which the robot performs work, and is information indicating a layout and a shape of an obstacle or the like. The peripheral information may be, for example, CAD data or three-dimensional data measured by a three-dimensional data measuring device.

The work information, the grasping information, the workpiece posture information, the robot specification information, and the peripheral information are input to the robot posture determination device 10 via the input device 18, the storage medium reading device 22, or the communication I/F 24. The acquisition unit 32 passes the acquired work information, the grasping information, the workpiece posture information, the robot specification information, and the peripheral information to each of the generation unit 34 and the searching unit 36.

The generation unit 34 generates a graph for searching for a posture of the robot at each target point at which the operation time is the shortest. The graph includes a plurality of nodes corresponding to the respective target points, a plurality of edges connecting the nodes corresponding to the target points, and weights given to the edges.

Specifically, the generation unit 34 specifies a plurality of candidates for the workpiece posture for each target point. The candidate for the workpiece posture is one of the workpiece postures indicated by the respective pieces of workpiece posture information as illustrated in FIG. 5.

The generation unit 34 specifies a plurality of candidates for the hand posture for each target point. The candidate for the hand posture is a candidate for the posture of the robot hand that grasps the workpiece. There are a plurality of grasping postures of the robot hand for a certain workpiece posture as illustrated in FIG. 4. More specifically, the generation unit 34 specifies a relative posture of the TCP with respect to the workpiece based on the work information and the grasping information for each workpiece posture for each target point. Then, the generation unit 34 sets a position of the TCP as a position of the target point, sets a posture of the TCP as a posture obtained by converting the specified relative posture of the TCP into the world coordinate system, and specifies the hand posture.

Figure 6:
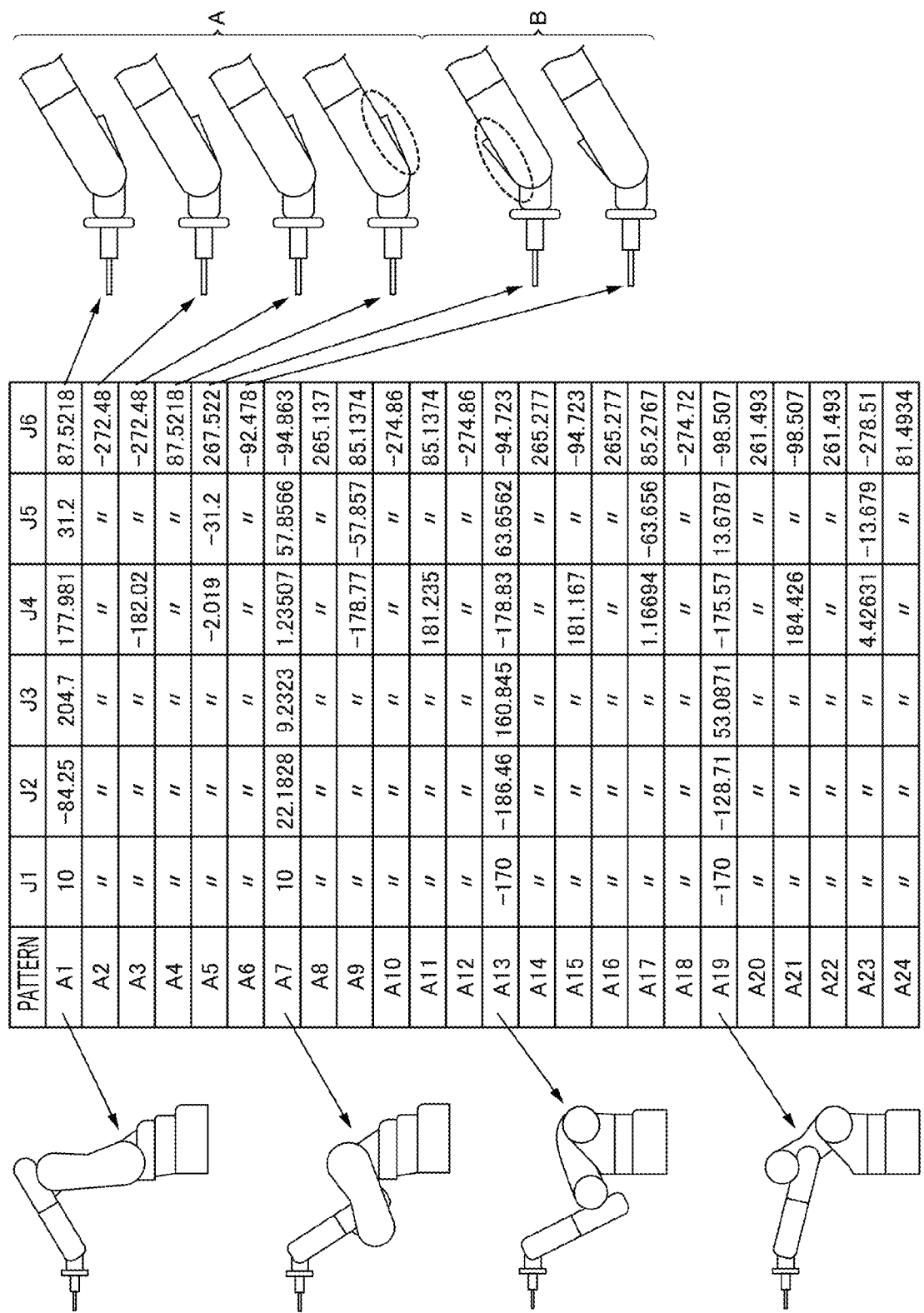
FIG. 6 is a diagram illustrating an example of a list of robot postures specified for a certain hand posture.

The generation unit 34 specifies a plurality of candidates for the robot posture. The robot posture is a posture of the robot according to the hand posture for grasping the workpiece, which is obtained based on the hand posture and the kinematics information. Specifically, the generation unit 34 specifies the posture of the robot, that is, a value of each joint from the position and the posture of the TCP by inverse kinematics. There are a plurality of robot postures for one hand posture. FIG. 6 illustrates an example of a list of robot postures specified for a certain hand posture. In the example illustrated in FIG. 6, there are four variations in the values of the joints J1 to J3, and among them, there are six variations in the combinations of J4 to J6, and a total of 24 patterns of robot postures are specified. For the six variations of the combinations of J4 to J6, appearances of the postures of the robot in a same group (A or B) are the same, but the values of J4 to J6 are different. In the example of FIG. 6, the positions of the protruding portions (broken line portions in FIG. 6) of the robot are different between the group A and the group B.

Figure 7:
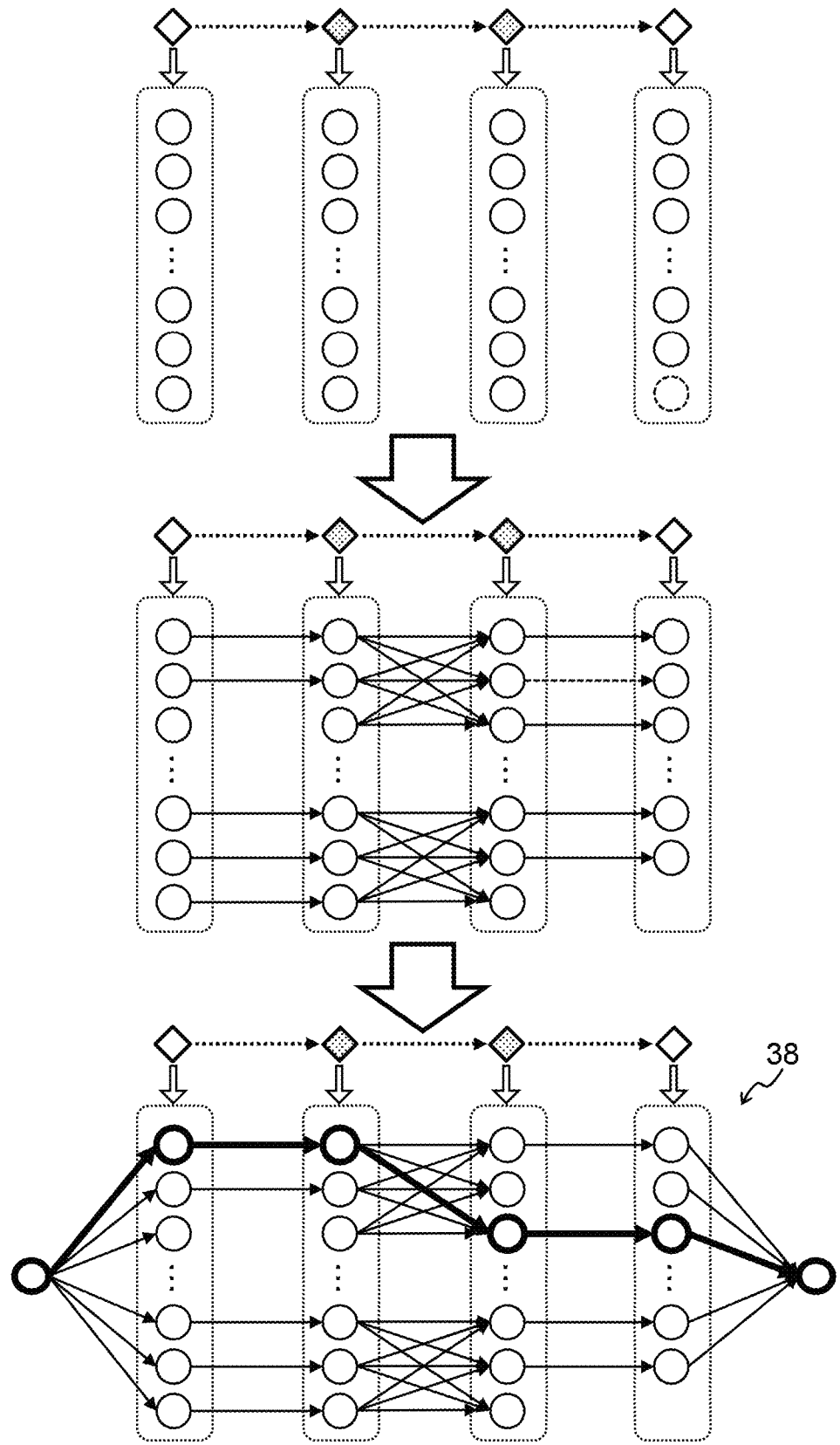
FIG. 7 is a diagram for describing generation of a graph and search for a shortest path.
Figure 8:
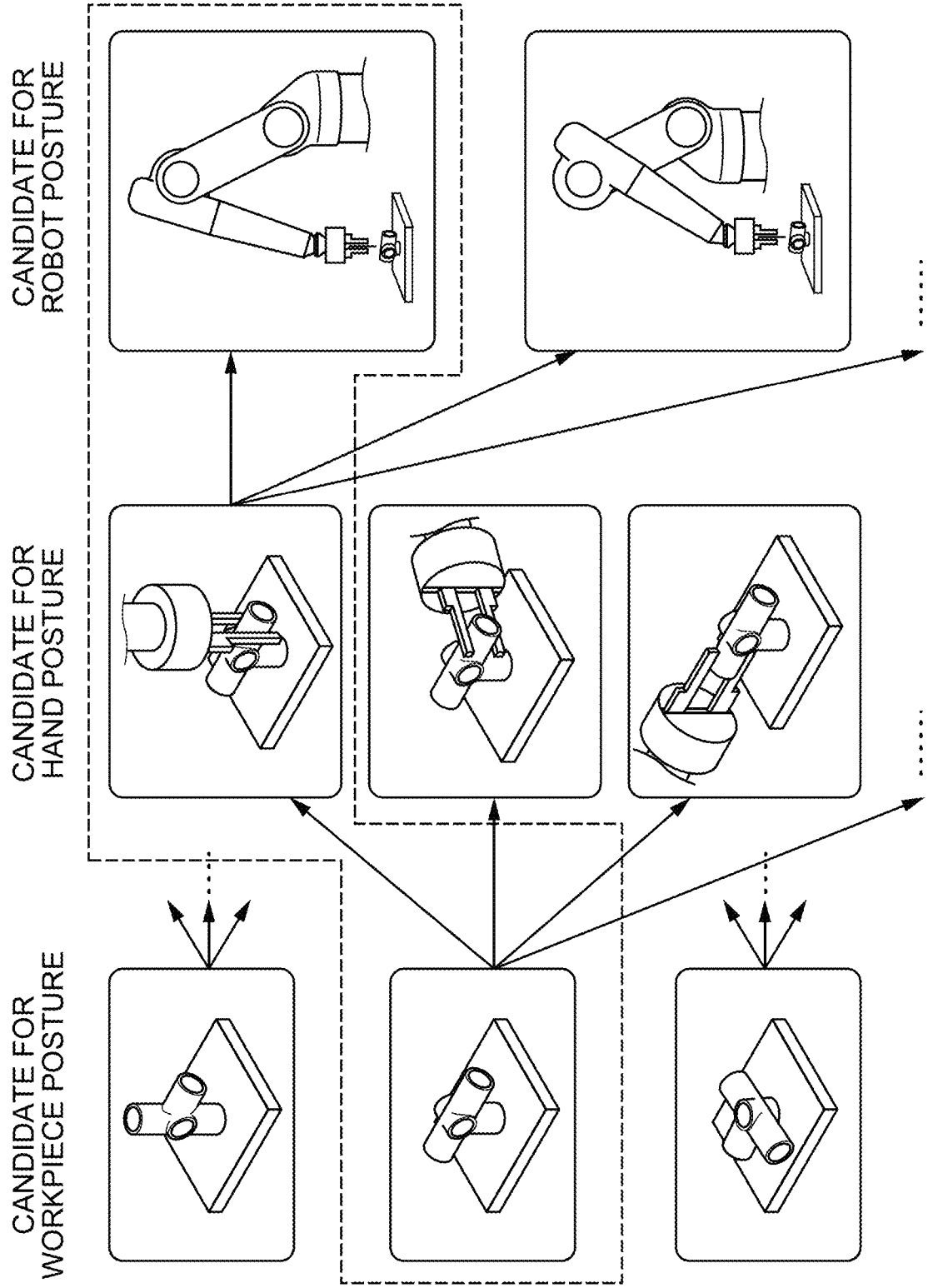
FIG. 8 is a diagram for describing a combination of a candidate for a workpiece posture, a candidate for a hand posture, and a candidate for a robot posture corresponding to one node.

As illustrated in an upper diagram of FIG. 7, the generation unit 34 generates nodes corresponding to combinations of candidates for a workpiece posture, candidates for a hand posture, and candidates for a robot posture specified for each target point. In the example of FIG. 7, a circle corresponds to one node. For example, as indicated by a broken line portion in FIG. 8, one combination is selected from each of the candidates for the workpiece posture, the candidates for the hand posture, and the candidates for the robot posture, and corresponds to one node. In the example of FIG. 7, a group of nodes corresponding to one target point (a white rhombus or a shaded rhombus in FIG. 7) is indicated by being surrounded by a dotted line.

The generation unit 34 determines whether the robot interferes with the peripheral environment (hereinafter, also referred to as "obstacle") based on the robot posture, the peripheral information, and the shape information of the robot included in the robot specification information. In a case where it is determined that interference occurs, the generation unit 34 does not generate a node corresponding to a combination including the robot posture. For example, in a case where the robot interferes with a peripheral obstacle in the robot posture included in a combination corresponding to a node indicated by a broken line in the upper diagram of FIG. 7, the generation unit 34 deletes the node.

As illustrated in a middle diagram of FIG. 7, the generation unit 34 generates an edge connecting nodes corresponding to combinations transitionable between target points. The generation unit 34 connects edges (solid arrows in FIG. 7) in a direction from a start point to an end point of the operation of the robot. That is, among the two nodes connected by the edge, a node (hereinafter, referred to as "From node") corresponding to the target point on the start point side is a start point of the edge, and a node (hereinafter, referred to as "To node") corresponding to the target point on the end point side is an end point of the edge.

The generation unit 34 determines whether the grasping postures are the same as a determination as to whether it is the combinations transitionable between the target points. The grasping posture is specified based on the workpiece posture and the hand posture included in the combinations. In a case where the grasping postures are not the same, the generation unit 34 determines that the combinations are non-transitionable, and does not generate an edge between the nodes corresponding to the combinations. Since the workpiece once grasped by the robot hand is not grasped again during the operation of the robot, constraint of the edge connection is that the grasping posture, that is, the way of grasping the workpiece by the robot hand is the same.

The generation unit 34 determines whether the forms of the robot postures are the same when the operation of the robot between the postures of the robot corresponding to the nodes, that is, the transition of the position of the TCP is linear movement, as the determination of whether the combinations are combinations transitionable between the target points. For example, the generation unit 34 may determine whether the forms of the two robot postures are the same based on a relative relationship between a joint value and a link posture. This is because, in the articulated robot, linear movement of the TCP has a mechanical characteristic that the forms of the robot postures have to be in the same form.

The generation unit 34 determines whether there is a possibility that unavoidable interference with the peripheral environment may occur in the operation between the robot postures based on the peripheral information and the shape information of the robot as the determination of whether the combinations are combinations transitionable between the target points. For example, in a case where a part of the robot in the robot posture corresponding to the From node is in a state of approaching an obstacle, the generation unit 34 may determine that there is a possibility of occurrence of unavoidable interference with the peripheral environment. In this case, since it is difficult to change the robot posture from the robot posture corresponding to the From node, it is determined that there is a possibility that unavoidable interference occurs when the robot is operated to the robot posture corresponding to the To node. The state of approaching the obstacle may be a case where a shortest distance between the robot and the obstacle is a predetermined value or less. The part of the robot may be a portion close to the base side of the robot. This is because the closer the portion close to the base is to the obstacle, the more difficult it is to change the robot posture from that state. This determination has constraint of excluding unnecessary edges in a graph for searching for a path in which the operation time is the shortest finally. Here, it is determined whether unavoidable interference occurs without calculating an actual path between target points by path planning or the like. As a result, a graph generation time is shortened, and as a result, a search time for a path in which the operation time is the shortest is also shortened.

In the middle diagram of FIG. 7, a broken line arrow indicates a case where no edge is generated between nodes due to the above-described constraint.

The generation unit 34 gives an index related to the operation time of the robot between the robot postures corresponding to the nodes connected by the edge to the edge. The generation unit 34 calculates an estimated operation time that can be calculated by a simple method without calculating an actual operation time by path planning or the like as the index related to the operation time. For example, the generation unit 34 calculates an index based on a difference between robot postures corresponding the nodes as the estimated operation time. More specifically, the generation unit 34 calculates, as the estimated operation time, a maximum value of a value obtained by dividing a difference in a rotation angle of each joint of the robot by a maximum value of a rotation speed of each joint.

For example, the generation unit 34 may consider that the operation is always performed by joint interpolation from the robot posture corresponding to the From node to the robot posture corresponding to the To node at a maximum speed without considering an interference avoidance operation, and calculate the estimated operation time as described below.

Nf: robot posture of From node $Nf=\{J_{f1},J_{f2},J_{f3},J_{f4},J_{f5},J_{f6}\}$ Nt: robot posture of To node $Nt=\{J_{t1},J_{t2},J_{t3},J_{t4},J_{t5},J_{t6}\}$ Vmaxj: maximum speed of j-th joint of robot $t_e$: estimated operation time $t_e(Nf,Nt)=\max((J_{fj}-J_{tj})/V\max_j|j=1,\ldots,6)$ In the estimated operation time, an acceleration/deceleration time at the time of operating the robot is not taken into consideration, but an acceleration time until reaching the maximum speed and a deceleration time until reaching a stop speed may be simply calculated and included in the calculation of the estimated operation time.

The generation unit 34 gives the estimated operation time calculated as described above to each edge as a weight. The generation unit 34 generates a temporary start node before the target point corresponding to the start point of the operation, and generates an edge connecting the start node and each node corresponding to the target point corresponding to the start point of the operation. Similarly, the generation unit 34 generates a temporary goal node after the target point corresponding to the end point of the operation, and generates an edge connecting each node corresponding to the target point corresponding to the end point of the operation and the goal node. The generation unit 34 gives the same weight to each of the edges connected to the start node and the goal node. This weight may be an extremely small value so as not to affect the operation time for each path. For example, it may be a value of 1/10 of a minimum value of the estimated operation time given to the edge in the graph. The generation unit 34 stores the generated graph 38 in a predetermined storage region.

The searching unit 36 uses the graph 38 to search for a sequence of robot postures in which the operation time is the shortest among sequences of robot postures at each target point. For example, the searching unit 36 searches for a path (hereinafter, referred to as "shortest path") having a shortest sum of the estimated operation times given to the edges included in the path among the paths from the start node to the goal node included in the graph 38. For example, a Dijkstra method or the like may be applied to search for such a shortest path. In a lower diagram of FIG. 7, the searched shortest path is indicated by a thick line. The searching unit 36 outputs a sequence of robot postures corresponding to each node included in the searched shortest path as the sequence of the robot postures in which the operation time is the shortest.

Figure 9:
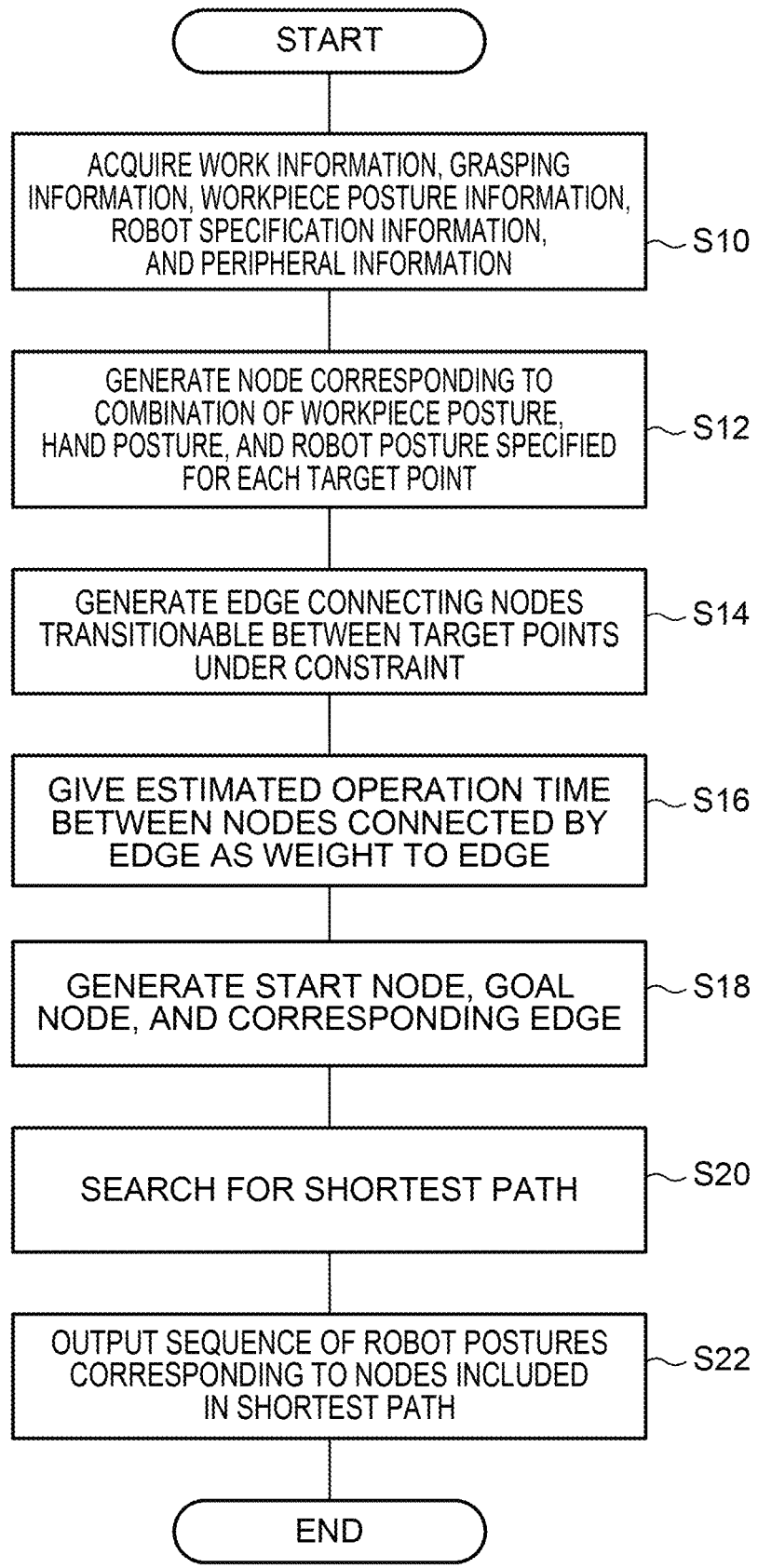
FIG. 9 is a flowchart illustrating a flow of robot posture determination processing according to a first embodiment.

Next, the operation of the robot posture determination device 10 according to the first embodiment will be described. FIG. 9 is a flowchart illustrating a flow of robot posture determination processing executed by the CPU 12 of the robot posture determination device 10. The CPU 12 reads the robot posture determination program from the storage device 16, develops the program in the memory 14, and executes the program, whereby the CPU 12 functions as each functional configuration of the robot posture determination device 10, and the robot posture determination processing shown in FIG. 9 is executed.

In step S10, the acquisition unit 32 acquires the work information, the grasping information, the workpiece posture information, the robot specification information, and the peripheral information, and passes the acquired information to the generation unit 34.

Next, in step S12, the generation unit 34 specifies a plurality of candidates for the workpiece posture, a plurality of candidates for the hand posture, and a plurality of candidates for the robot posture for each target point. Then, the generation unit 34 generates a node corresponding to a combination of the candidate for the workpiece posture, the candidate for the hand posture, and the candidate for the robot posture specified for each target point. When it is determined that the robot interferes with a peripheral obstacle based on the robot posture, the peripheral information, and the shape information of the robot, the generation unit 34 deletes the node corresponding to the robot posture.

Next, in step S14, the generation unit 34 generates an edge connecting nodes corresponding to combinations transitionable between target points under constraints such as the same grasping posture, the same form of the robot posture in the case of linear movement, and no unavoidable interference with the peripheral environment.

Next, in step S16, the generation unit 34 calculates, as the estimated operation time, the maximum value of the value obtained by dividing the difference in the rotation angle of each joint of the robot by the maximum value of the rotation speed of each joint between the robot postures corresponding to the nodes connected by the edge, for example. Then, the generation unit 34 gives the calculated estimated operation time as a weight of the edge connecting the nodes.

Next, in step S18, the generation unit 34 generates a start node and a goal node. The generation unit 34 generates an edge connecting the start node and each node corresponding to the target point corresponding to the start point of the operation, and an edge connecting each node corresponding to the target point corresponding to the end point of the operation and the goal node. Then, the generation unit 34 gives a weight of the same and extremely small value to each of the edges connected to the start node and the goal node. As a result, the graph 38 is generated.

Next, in step S20, the searching unit 36 searches for a path in which the sum of the estimated operation times given to the edges included in the path is the shortest, that is, the shortest path, among the paths from the start node to the goal node included in the graph 38 by the Dijkstra method or the like, for example. Next, in step S22, the searching unit 36 outputs a sequence of robot postures corresponding to the respective nodes included in the searched shortest path as a sequence of robot postures in which the operation time is the shortest, and the robot posture determination processing ends.

As described above, the robot posture determination device according to the first embodiment acquires work information, grasping information, workpiece posture information, and robot specification information. Then, the robot posture determination device generates a graph including nodes corresponding to respective combinations of the candidates for the workpiece posture, the candidates for the hand posture, and the candidates for the robot posture, and edges connecting the nodes corresponding to combinations transitionable between the target points. The robot posture determination device gives an estimated operation time of the robot between robot postures corresponding to nodes connected by the edge to the edge as a weight. Then, the robot posture determination device uses the graph to search for and output a sequence of the robot postures at each of the plurality of target points, resulting in the shortest estimated operation time. As described above, by associating the combinations of the workpiece posture, the hand posture, and the robot posture with the nodes of the graph for searching for the shortest path, the grasping state with respect to the workpiece can also be considered. When the nodes are connected by the edge, it is possible to suppress generation of an unnecessary edge and simplify the generated graph by considering constraints on identity of the form of the grasping posture and the robot posture. By giving the estimated operation time using the difference between the robot postures as the weight of the edge instead of the actual operation time between the robot postures corresponding to the nodes connected by the edge, the calculation time from the generation of the graph to the shortest path search can be shortened. Therefore, according to the robot posture determination device according to the first embodiment, it is possible to efficiently determine the optimum posture of the robot including the grasping state with respect to the workpiece.

A user can determine the sequence of robot postures in which the operation time is the shortest regardless of the intuition, the skill, the experience, and the like. Therefore, in the construction of the robot system, it is possible to shorten a startup time and reduce dependence on a skilled technician. It is easy to newly construct or change the robot system, and productivity is improved.

The robot posture determination device according to the first embodiment acquires peripheral information indicating a peripheral environment in which the robot works, and does not generate corresponding nodes and edges in the graph when the robot and a peripheral obstacle or the like interfere with each other. As a result, generation of unnecessary nodes and edges can be suppressed, the generated graph can be simplified, and the shortest path search can be efficiently performed.

Second Embodiment

Next, a second embodiment will be described. In a robot posture determination device according to a second embodiment, the same components as those of the robot posture determination device 10 according to the first embodiment are denoted by the same reference numerals, and a detailed description thereof will be omitted. In the functional configuration in which last two digits of the reference numeral are common between the first embodiment and the second embodiment, detailed description of the common function will be omitted. Since a hardware configuration of the robot posture determination device according to the second embodiment is similar to the hardware configuration of the robot posture determination device 10 according to the first embodiment illustrated in FIG. 2, the description thereof will be omitted.

In the robot posture determination device 10 according to the first embodiment, a case where the estimated operation time is used as the weight of the edge in the graph has been described. In the second embodiment, a method of searching for a shortest path with higher accuracy while updating the weight of the edge to a more accurate operation time will be described.

A functional configuration of a robot posture determination device 210 according to the second embodiment will be described. As illustrated in FIG. 3, the robot posture determination device 210 includes an acquisition unit 32, a generation unit 34, and a searching unit 236 as functional configurations. Each functional configuration is implemented by the CPU 12 reading the robot posture determination program stored in the storage device 16, developing the program in the memory 14, and executing the program. The graph 38 generated by the generation unit 34 is stored in a predetermined storage region of the robot posture determination device 210.

Figure 10:
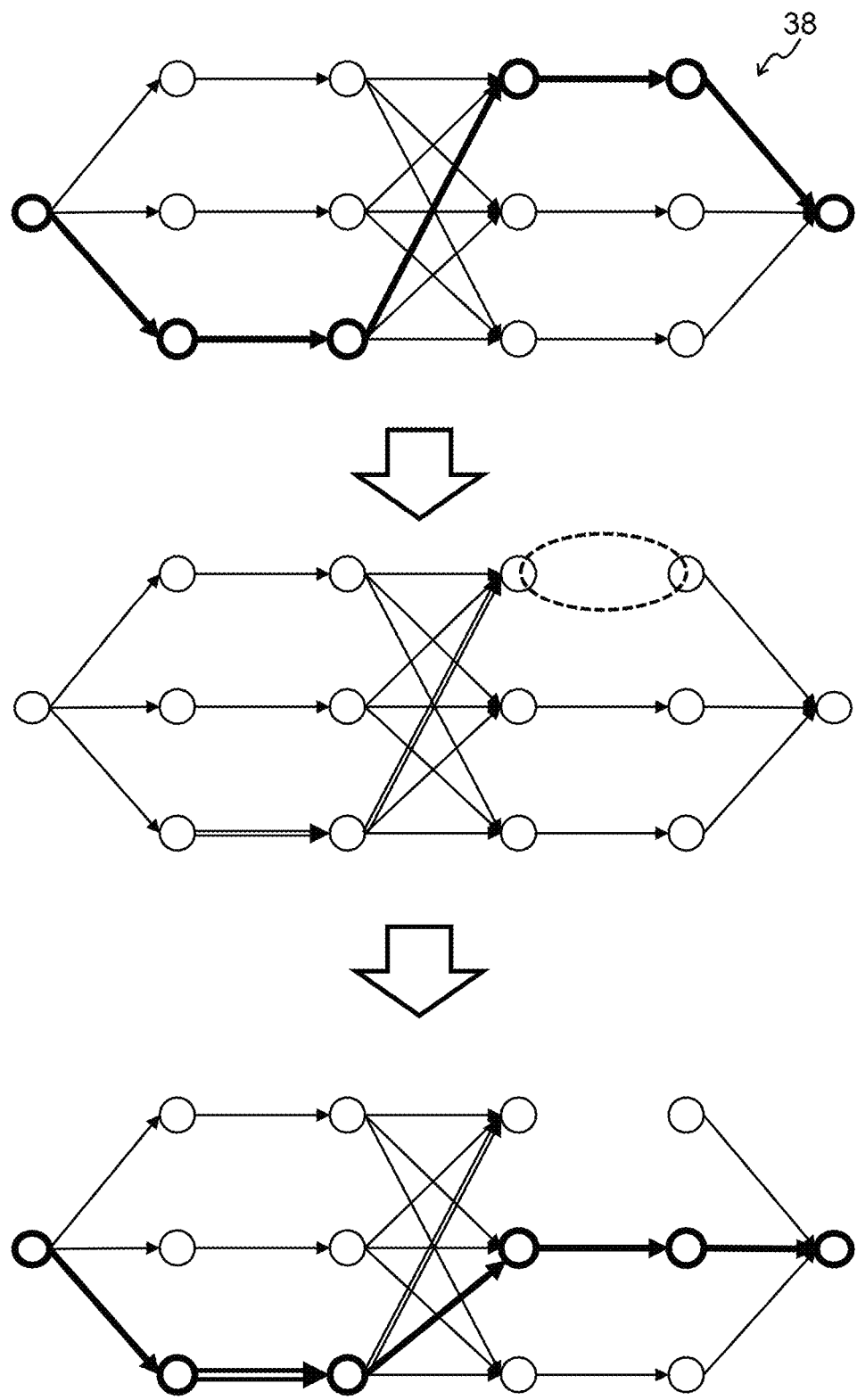
FIG. 10 is a diagram for describing search for a shortest path in a second embodiment.

As illustrated in an upper diagram of FIG. 10, the searching unit 236 first searches for a shortest path from the graph generated by the generation unit 34, similarly to the searching unit 36 according to the first embodiment. Then, the searching unit 236 calculates an actual operation time (hereinafter, referred to as "actual operation time") of the robot between the robot postures corresponding to the nodes included in the searched shortest path, and updates the weights of the edges between the nodes with the calculated actual operation time as illustrated in a middle diagram of FIG. 10. In FIG. 10, edges indicated by double line arrows represent the edges in which the weights are updated from the estimated operation time to the actual operation time.

The searching unit 236 determines, as the actual operation time, a speed and acceleration/deceleration when the robot operates by joint interpolation while avoiding interference with the peripheral environment between the robot postures corresponding to the nodes, and calculates an operation time when the robot operates at a determined speed and acceleration/deceleration. For example, the searching unit 236 plans a path between the robot postures corresponding to the nodes by using a rapidly-exploring random tree (RRT), a probabilistic roadmap method (PRM), or the like. Then, the searching unit 236 may calculate the operation time based on the planned path. In a case where a path capable of avoiding interference with the peripheral environment is not found as the path between the robot postures corresponding to the nodes in a process of calculating the actual operation time, the searching unit 236 deletes an edge between the nodes. In the middle diagram of FIG. 10, a portion indicated by a dashed ellipse represents that the edge has been deleted.

As illustrated in a lower diagram of FIG. 10, the searching unit 236 searches for a shortest path by using the graph in which the weight of the edge is updated. Then, the searching unit 236 repeats the update of the weight of the edge based on the actual operation time and the search for the shortest path until the same shortest path as the previously searched shortest path is searched for. The estimated operation time is an operation time in which the interference avoidance operation, the accurate speed, and the acceleration/deceleration are not considered, and the actual operation time is a time in which the interference avoidance operation, the accurate speed, and the acceleration/deceleration are considered. Therefore, actual operation time≥estimated operation time always holds. Therefore, in a case where the same shortest path as the previously searched shortest path is searched for while the weight of the edge is updated from the estimated operation time to the actual operation time and the search for the shortest path is repeated, it represents that there is no shortest path with a shorter operation time. Therefore, the search for the shortest path ends at that stage. The searching unit 236 outputs a sequence of robot postures corresponding to each node included in the shortest path at the time when the search for the shortest path ends as a sequence of robot postures in which the operation time is the shortest.

Figure 11:
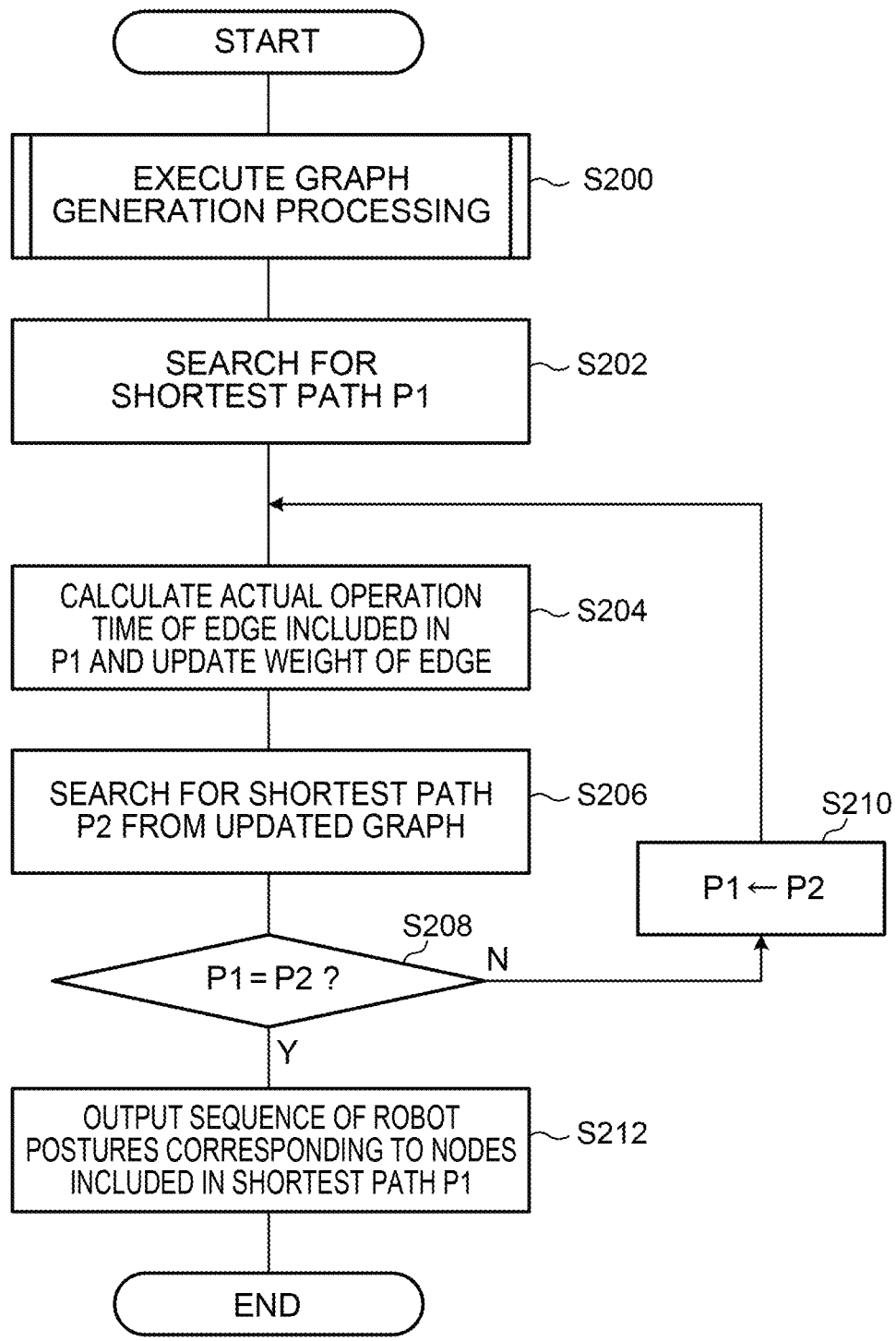
FIG. 11 is a flowchart illustrating a flow of robot posture determination processing according to the second embodiment.

Next, the operation of the robot posture determination device 210 according to the second embodiment will be described. FIG. 11 is a flowchart illustrating a flow of robot posture determination processing executed by the CPU 12 of the robot posture determination device 210. The CPU 12 reads the robot posture determination program from the storage device 16, develops the program in the memory 14, and executes the program, whereby the CPU 12 functions as each functional configuration of the robot posture determination device 210, and the robot posture determination processing shown in FIG. 11 is executed.

In step S200, graph generation processing is executed. The graph generation processing is similar to steps S10 to S18 of the robot posture determination processing (FIG. 9) in the first embodiment. Next, in step S202, the searching unit 236 searches for a shortest path P1 from the graph 38 generated in step S200 described above.

Next, in step S204, the searching unit 236 calculates the actual operation time of the robot between the robot postures corresponding to the nodes included in the searched shortest path P1, and updates the weight of the edge between the nodes from the estimated operation time to the calculated actual operation time. Next, in step S206, the searching unit 236 searches for a shortest path P2 from the graph 38 in which the weight of the edge is updated.

Next, in step S208, the searching unit 236 determines whether the shortest path P1 and the shortest path P2 are the same. When P1 #P2, the processing proceeds to step S210, and the searching unit 236 sets the shortest path P2 searched in step S206 as the shortest path P1, and returns to step S204. In this regard, when P1=P2, the processing proceeds to step S212.

In step S212, the searching unit 236 outputs a sequence of robot postures corresponding to the respective nodes included in the shortest path P1 as a sequence of robot postures in which the operation time is the shortest, and the robot posture determination processing ends.

As described above, the robot posture determination device according to the second embodiment repeats the search for the shortest path while updating the weight of the edge included in the searched shortest path from the estimated operation time to the actual operation time. As a result, the calculation time from the generation of the graph to the search for the shortest path can be shortened as compared with a case where all the weights of the edges are set to the actual operation time. It is possible to determine a sequence of robot postures in which the operation time is the shortest with higher accuracy as compared with a case where all the weights of the edges are used as the estimated operation time.

In each of the above embodiments, a case of outputting the sequence of robot postures corresponding to the nodes included in the searched shortest path has been described. However, workpiece posture information corresponding to the nodes may also be output. This makes it possible to determine the sequence of robot postures in which the operation time is the shortest as well as, for example, the workpiece posture when the workpiece is arranged on the workbench.

The disclosed technique can be applied to an off-line teaching tool of a robot, a simulation tool such as a cyber-physical system (CPS), CAD, or the like.

The robot posture determination processing executed by the CPU reading software (program) in each of the above embodiments may be executed by various processors other than the CPU. Examples of the processor in this case include a programmable logic device (PLD) in which a circuit configuration can be changed after manufacture such as a field-programmable gate array (FPGA) or the like, a dedicated electric circuit that is a processor having a circuit configuration exclusively designed for executing specific processing such as an application specific integrated circuit (ASIC) or the like. The robot posture determination processing may be executed by one of these various processors, or may be executed by a combination of two or more processors of the same type or different types (for example, a plurality of FPGAs, a combination of a CPU and an FPGA, and the like). More specifically, the hardware structure of these various processors is an electric circuit in which circuit elements such as semiconductor elements are combined.

In each of the above embodiments, the aspect in which the robot posture determination program is stored (installed) in the storage device in advance has been described, but the present invention is not limited thereto. The program may be provided in a form stored in a storage medium such as a CD-ROM, a DVD-ROM, a Blu-ray disk, or a USB memory. The program may be downloaded from an external device via a network.

All documents, patent applications, and technical standards described in this specification are incorporated herein by reference to the same extent as if each document, patent application, and technical standard were specifically and individually indicated to be incorporated by reference.

REFERENCE SIGNS LIST 10, 210 Robot posture determination device
12 CPU
14 Memory
16 Storage device
18 Input device
20 Output device
22 Storage medium reading device
24 Communication I/F
26 Bus
32 Acquisition unit 34 Generation unit
36, 236 Searching unit
38 Graph

The invention claimed is:

1. A robot posture determination device, comprising:
a memory in which a program is recorded; and
at least one processor operatively connected to the memory and, by executing the program, performing:
acquiring work information related to work to be performed by a robot having a hand part, grasping information indicating a plurality of candidates for a relative positional relationship between the hand part and a workpiece to be grasped by the hand part, workpiece posture information indicating a plurality of candidates for a posture adoptable by the workpiece, and specification information including kinematics information regarding the robot; and
associating, for each of a plurality of target points on a path of the robot for performing the work, respective combinations of the workpiece posture information, a posture of the hand part for grasping the workpiece obtained based on the work information, the grasping information, and the workpiece posture information, and a posture of the robot according to the posture of the hand part obtained based on the posture of the hand part and the kinematics information, and searching for a sequence of the combinations that will result in a shortest operation time of the robot based on an index related to an operation time of the robot between the postures of the robot, from sequences of the combinations that are transitionable between the target points.

2. The robot posture determination device according to claim 1, wherein the processor determines that the combinations are non-transitionable between the target points when grasping postures specified based on the workpiece posture information and the posture of the hand part of the combinations are different.

3. The robot posture determination device according to claim 1, wherein the processor determines that the combinations are non-transitionable between the target points when operation of the robot between the postures of the robot in the combinations is linear movement and forms of the postures of the robot in the combinations are different.

4. The robot posture determination device according to claim 1, wherein the processor calculates an index based on a difference between the postures of the robot in the combinations as the index related to the operation time.

5. The robot posture determination device according to claim 4, wherein the processor calculates, as the index based on the difference in the postures of the robot, a maximum value of a value obtained by dividing a difference in a rotation angle of each joint of the robot by a maximum value of a rotation speed of each joint.

6. The robot posture determination device according to claim 1, wherein the processor generates a graph including a node corresponding to each of the combinations and an edge connecting nodes corresponding to the combinations that are transitionable between the target points, the graph applying the index related to the operation time to the edge, and searches for the sequence of the combinations that will result in the shortest operation time of the robot by using the graph.

7. The robot posture determination device according to claim 6, wherein:
the processor acquires peripheral information indicating a peripheral environment in which the robot performs the work and the specification information further including dynamics information and shape information of the robot, and
the processor determines, based on the peripheral information, the specification information, and the posture of the robot, that nodes at which unavoidable interference with the peripheral environment is estimated to occur in a path between the postures of the robot corresponding to the nodes are nodes corresponding to the combinations that are non-transitionable between the target points.

8. The robot posture determination device according to claim 7, wherein the processor does not generate the node corresponding to the combination including the posture of the robot that interferes with the peripheral environment at the target point.

9. The robot posture determination device according to claim 7, wherein the processor calculates an actual operation time of the robot between postures of the robot corresponding to nodes connected by an edge included in a path of the graph corresponding to the searched sequence, updates a weight of the edge between the nodes with the calculated actual operation time, and repeats the search for the sequence which results in the shortest operation time until a same sequence as the sequence searched last time is found.

10. The robot posture determination device according to claim 9, wherein the processor calculates, as the actual operation time, an operation time in a case where the robot operates an operation in which the robot avoids interference with the peripheral environment between the postures of the robot corresponding to the nodes at a set speed or with acceleration/deceleration.

11. The robot posture determination device according to claim 1, wherein the target point includes a work point at which the hand part grasps or releases the workpiece and an operation change point at which an operation direction of the robot is changed.

12. A robot posture determination method, comprising:
acquiring, by a processor, work information related to work to be performed by a robot having a hand part, grasping information indicating a plurality of candidates for a relative positional relationship between the hand part and a workpiece to be grasped by the hand part, workpiece posture information indicating a plurality of candidates for a posture adoptable by the workpiece, and specification information including kinematics information regarding the robot; and
associating, by the processor, for each of a plurality of target points on a path of the robot for performing the work, respective combinations of the workpiece posture information, a posture of the hand part for grasping the workpiece obtained based on the work information, the grasping information, and the workpiece posture information, and a posture of the robot according to the posture of the hand part obtained based on the posture of the hand part and the kinematics information, and searching for a sequence of the combinations that will result in a shortest operation time of the robot based on an index related to an operation time of the robot between the postures of the robot, from sequences of the combinations that are transitionable between the target points.

13. A non-transitory storage medium storing a robot posture determination program, executable by a computer including a processor to function as:
the processor configured to acquire work information related to work to be performed by a robot having a hand part, grasping information indicating a plurality of candidates for a relative positional relationship between the hand part and a workpiece to be grasped by the hand part, workpiece posture information indicating a plurality of candidates for a posture adoptable by the workpiece, and specification information including kinematics information regarding the robot; and the processor further configured to associate, for each of a plurality of target points on a path of the robot for performing the work, respective combinations of the workpiece posture information, a posture of the hand part for grasping the workpiece obtained based on the work information, the grasping information, and the workpiece posture information, and a posture of the robot according to the posture of the hand part obtained based on the posture of the hand part and the kinematics information, and search for a sequence of the combinations that will result in a shortest operation time of the robot based on an index related to an operation time of the robot between the postures of the robot, from sequences of the combinations that are transitionable between the target points.

* * * * *